Sept. 23, 1969     R. K. SUAN     3,468,211
MULTI-PIECE BOLT
Filed Dec. 20, 1967
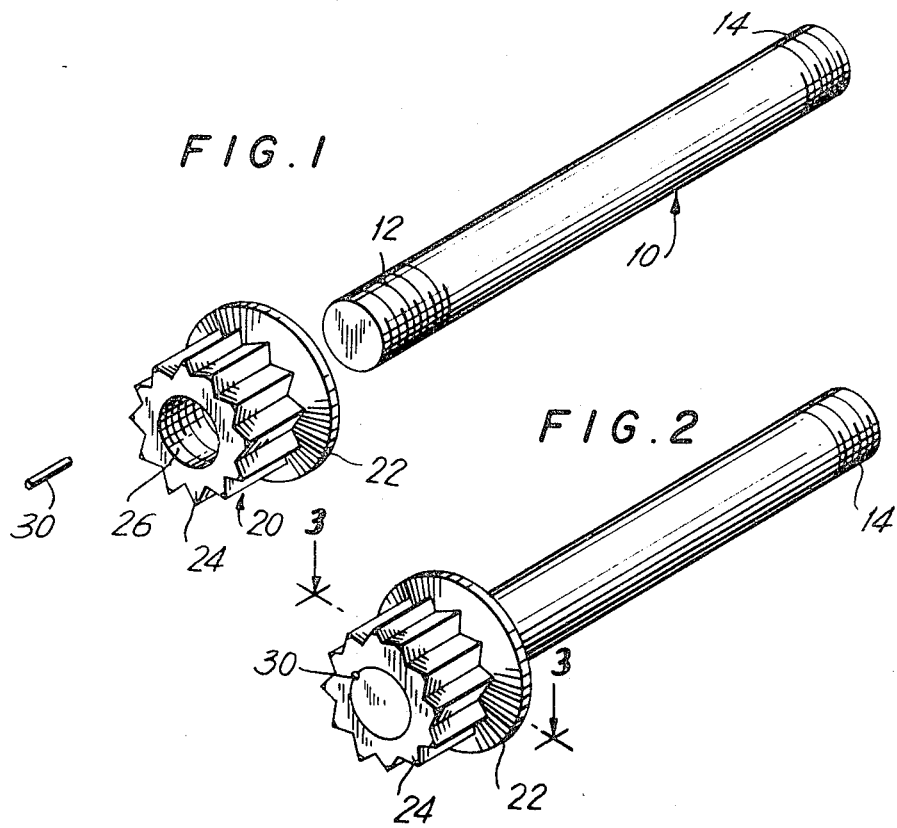
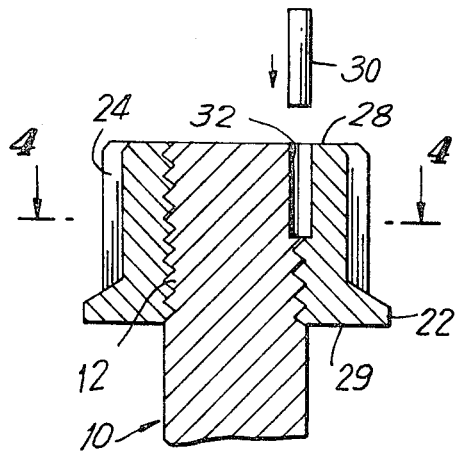
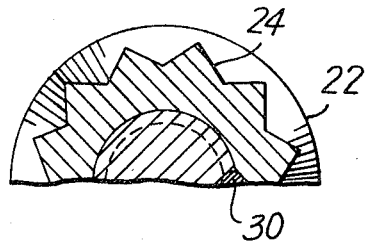
INVENTOR.
ROBIN K. SUAN
BY Andrew L. Hey
ATTORNEY

United States Patent Office 3,468,211
Patented Sept. 23, 1969

3,468,211
MULTI-PIECE BOLT
Robin K. Suan, Bryn Mawr, Pa., assignor to Standard Pressed Steel Co., Jenkintown, Pa., a corporation of Pennsylvania
Filed Dec. 20, 1967, Ser. No. 692,131
Int. Cl. F16b *23/00, 39/04;* B23g *9/00*
U.S. Cl. 85—9
5 Claims

ABSTRACT OF THE DISCLOSURE

Headed male fasteners fabricated by turning an internally threaded member onto a threaded stud, drilling a blind hole into the threaded joint formed by the stud and nut, and inserting an oversized pin into the blind hole.

---

The present invention relates, in general, to fasteners and, in particular, to the fabrication of high-strength bolts especially useful in aircraft, missile and space applications.

Because of the severe requirements of the high-speed, heavier aircraft presently in use or being developed, much time and effort is being devoted to the development of new fastening devices and materials from which these devices may be fabricated. The high-temperature ranges, sonic vibration levels and loads to which these aircraft are subjected has resulted in the use of such high-strength materials as A286 Stainless Steel, Waspalloy, 300 Series Stainless Steels, alloy steels and other similar alloys in the fabrication of fasteners for these aircraft.

A characteristic of these alloys is that their strength is increased significantly if they are subjected to a combination of mechanical-working and heat treatment or mechanical-working alone. Mechanical-working as used herein involves the plastic deformation of a material as, for example, by a reduction in cross-sectional area through extrusion, drawing or rolling. Typical of the results achieved at the present time are ½" to ⅝" bolts having tensile strengths in excess of 200,000 p.s.i.

Generally, the fabrication of these mechanically-worked bolts by conventional techniques is limited by the size of presently available forging equipment and by the various handling and process control difficulties. For example, as these alloys are mechanically-worked, they harden and it becomes more difficult to continue the mechanical-working to complete the formation of configuration details such as wrenching surfaces. This adds to the size and power requirements of the equipment to be employed. In addition, the dies used to form the bolts must be able to withstand the extremely high forces developed during the bolt forming operation. In other cases, in order to achieve the desired results of mechanical-working some of these alloys are mechanically-worked while they are in a condition which, from the fabrication standpoint, is not conducive to the formation of configuration details. Various problems in handling the material and controlling the processing are encountered. As a result, presently available equipment and techniques generally do not permit efficient and practical fabrication of bolts from these mechanically-worked alloys.

Accordingly, it is an object of the present invention to provide new and improved high-strength bolts which may be fabricated in an efficient and practical manner from alloys which develop high-strength properties either by the combination of mechanical-working and heat treatment or by mechanical-working alone.

It is another object of the present invention to provide a method of fabricating high-strength bolts from these alloys through the use of conventional, presently available bolt-making equipment.

These objects, as well as others, are achieved according to the present invention by providing a threaded stud made of a mechanically-worked alloy and a nut and inserting the stud into the nut. The stud and the nut are joined together rigidly by drilling a blind hole along selected mating surfaces of the two and inserting a pin into this blind hole. As used herein, a "mechanically-worked alloy" refers to that class of alloys which develop high-strength properties either by the combination of mechanical-working and heat treatment or by mechanical-working alone.

For a better understanding of the present invention, together with other and further objects thereof, reference is made to the following description, taken in connection with the accompanying drawing, and its scope will be pointed out in the appended claims.

Referring to the drawing:

FIGURE 1 is an exploded perspective view of the component parts of a bolt constructed in accordance with the present invention prior to their assembly;

FIGURE 2 is a perspective view of a bolt constructed in accordance with the present invention;

FIGURE 3 is a sectional view taken along line 3—3 of FIGURE 2; and

FIGURE 4 is a horizontal section taken along line 4—4 of FIGURE 3.

Referring to the drawing, a bolt constructed in accordance with the present invention includes a stud 10, a nut 20, and a pin 30. Stud 10 is provided with externally threaded sections 12 and 14 at its two ends.

Nut 20 is composed of a flange section 22 and a splined section 24. The bore 26 of nut 20 is threaded to receive threaded section 12 of stud 10.

Stud 10 and nut 20 are made of a mechanically-worked alloy such as A286 Stainless Steel. Each of these parts is mechanically-worked by conventional equipment to the general configuration illustrated in FIGURE 1 except for the thread rolling operations. After mechanical-working, stud 10 and nut 20 are heat treated. A typical heat treating temperature range for A286 Stainless Steel is 1200°–1400° F. Such temperatures do not destroy the effects of mechanical-working. After heat treatment, the threads of sections 12 and 14 are rolled on stud 10 and bore 26 of nut 20 is tapped or internally thread rolled. The rolling operations provide further mechanical-working of the components.

The bolt illustrated in FIGURE 2 is assembled by turning threaded section 12 of stud 10 into bore 26 of nut 20. Next, a blind hole 32, most clearly illustrated in FIGURE 3, is drilled into the threaded joint formed by stud 10 and nut 20. Blind hole 32 extends from the upper end face 28 of nut 20 toward the lower end face 29 of the nut. Blind hole 32 preferably extends axially of the bolt and has an axis between the major diameter and minor diameter of either the threads of threaded section 12 of stud 10 or the threads in bore 26 of nut 20. As a result, two grooves aligned with one another are cut into bore 26 of nut 20 and threaded section 12 of stud 10.

After blind hole 32 has been drilled, pin 30, having a cross-sectional area slightly greater than that of the blind hole, is inserted into the blind hole. Pin 30 may be driven into the blind hole by a hammer or other suitable impacting tool so that the pin is tightly fitted within the hole. As a result, with the bolt in use, torque forces applied to the head of the bolt (nut 20) are transmitted to the shank of the bolt (stud 10). Preferably, the length of pin 30 is equal to the length of the blind hole so that the trailing end of the pin is flush with upper end face 28 of nut 20.

Blind hole 32 does not extend completely through nut 20 from upper end face 28 to lower end face 29 but for the embodiment illustrated has an axial length of approximately half the height of the nut. As a result, a number of the threads of the stud and nut are left intact. In order to provide maximum tension and fatigue strength characteristics to the bolt, the axial length of blind hole 32 and pin 30 preferably is limited to a length sufficient to transmit the expected torque forces for the particular application of the bolt.

Although only one pin 30 has been employed in the embodiment of the invention described and illustrated, it will be appreciated that two or more pins may be employed and that the actual number chosen for a particular bolt would be dependent upon the particular application and necessary load handling capabilities of the bolt. In addition, while for the embodiment of the invention described above both the stud and nut are made of the same mechanically-worked alloy, two different compatible alloys may be employed in practice. In addition, in certain instances it will be sufficient to fabricate only the stud from a mechanically-worked alloy. Again the material chosen for the nut should be compatible with the stud material. The choice of materials is dependent upon the application.

While there has been described what is at present considered to be the preferred embodiment of this invention, it will be obvious to those skilled in the art that various changes and modifications may be made therein without departing from the invention and it is, therefore, aimed to cover all such changes and modifications as fall within the true spirit and scope of the invention.

What is claimed is:
1. A bolt comprising:
a nut having upper and lower end faces with a threaded bore extending therebetwen and an axial groove extending generally parallel to said bore from said upper end face toward, but not reaching, said lower end face so as to be separated from said lower end face by a plurality of thread convolutions, said groove opening into said bore;
a stud made of a mechanically-worked alloy having a first externally threaded section turned into said nut a second externally threaded section at the end of said stud opposite from said first externally threaded section, the thread runout of said first externally threaded section being closer to said lower end face of said nut than to said upper end face, said first externally threaded section having a groove aligned with said groove in said bore of said nut and opening thereinto with the inner ends of said grooves terminating adjacent each other to form a blind hole extending from said upper end face into the threaded joint formed by said nut and said stud;
and an oversized pin tightly fitted within said blind hole to rigidly secure said nut to said stud.

2. A bolt according to claim 1 wherein said blind hole extends approximately to a point midway between said upper and lower end faces of said nut.

3. A bolt according to claim 1 wherein the axis of said blind hole is located between the major and minor diameter of either the threads of said first externally threaded section of said stud or the threads of said nut.

4. A bolt according to claim 3 wherein said axis of said blind hole extends axially of said nut and said stud.

5. A bolt according to claim 4 wherein said pin has a length equal to the depth of said blind hole.

References Cited
UNITED STATES PATENTS

| 1,017,371 | 2/1912 | Beck | 151—8 |
| 2,810,139 | 10/1957 | Plagemann | 85—9 |
| 2,895,368 | 7/1959 | Place | 85—1 |
| 2,985,898 | 5/1961 | Goude | 10—27 |
| 3,298,725 | 1/1967 | Boteler | 85—1 |

CARL W. TOMLIN, Primary Examiner

RAMON S. BRITTS, Assistant Examiner

U.S. Cl. X.R.

10—27; 151—8